Patented June 11, 1935

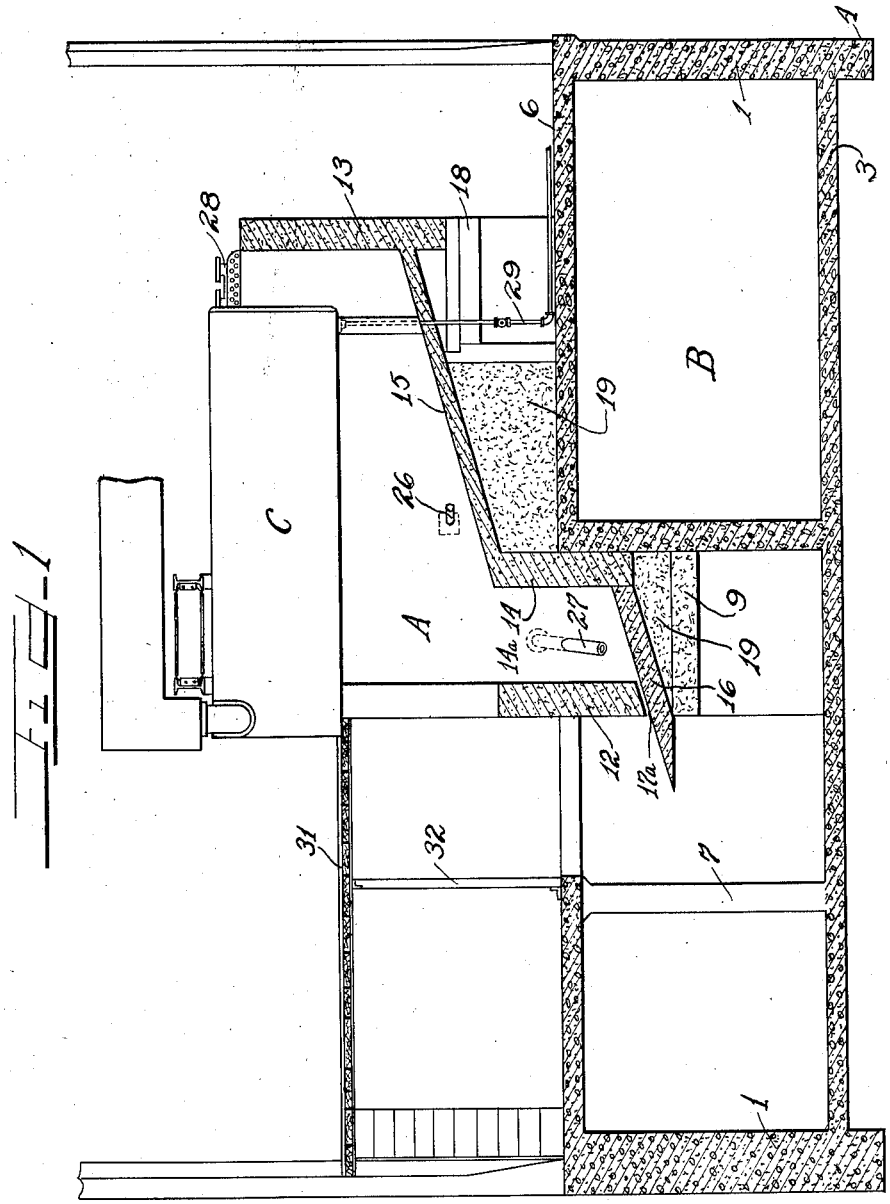

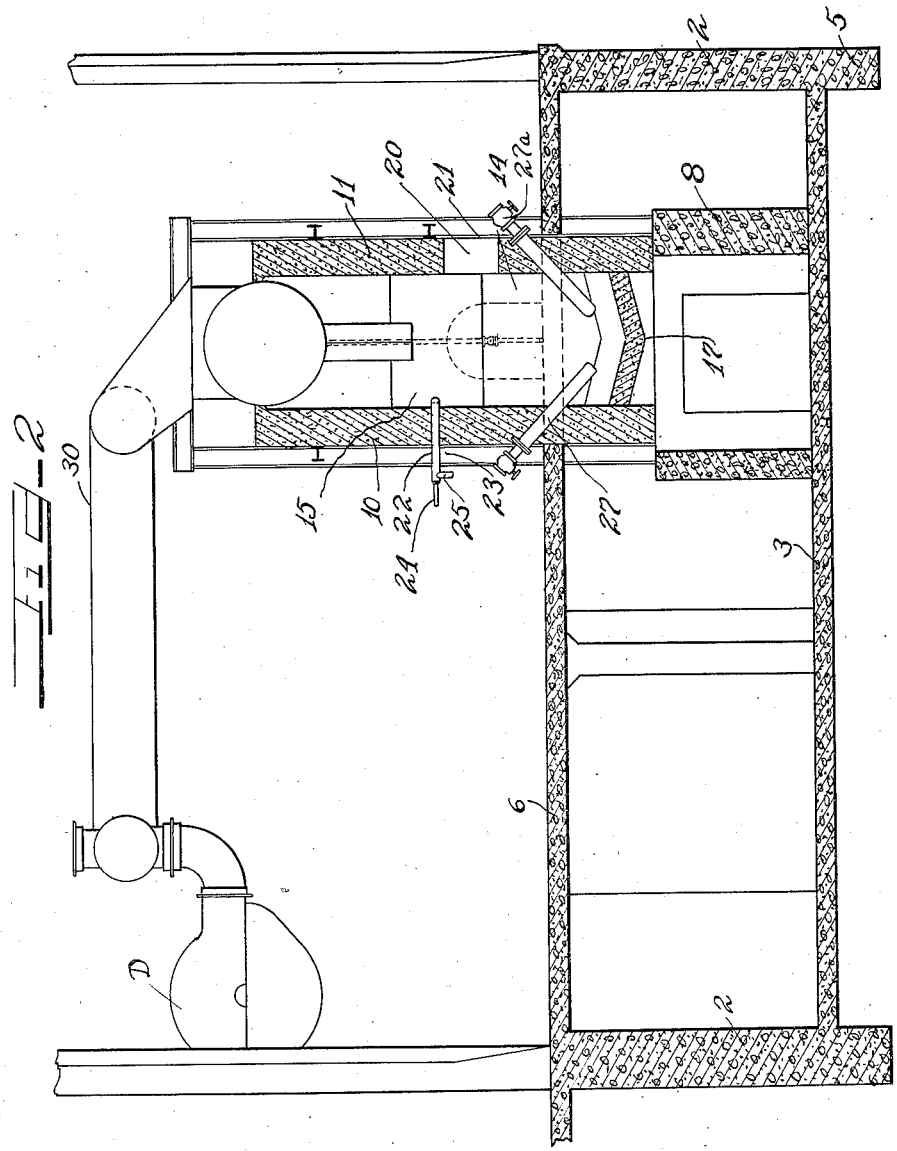

2,004,205

UNITED STATES PATENT OFFICE 2,004,205

SMELTING FURNACE FOR BLACK LIQUOR

Alfred G. Kernin, Mosinee, Wis., assignor to Mosinee Paper Mills Company, Mosinee, Wis., a corporation of Wisconsin Application January 9, 1932, Serial No. 585,656

2 Claims. (Cl. 23—277)

This invention relates to an apparatus for the recovery of chemicals in the sulfate process for the manufacture of pulp.

In the manufacture of sulfate pulp, a closed tank or digester is partly filled with chips of wood and a liquor, the active components of which are largely sodium hydroxide and sodium sulphide. Steam under pressure is introduced into the digester and the charge is cooked. The digester is then emptied into diffusers where the spent cooking liquor is drained off and the fiber washed. This spent liquor, known as black liquor, contains practically all of the chemicals in changed form that were used for the cooking and, in addition, the organic substances removed from the wood. Before the chemicals in the liquor can be re-utilized, they must be freed from the organic substances that are associated with them. To accomplish the regeneration of the black liquor, that is, the reclamation of the chemicals, the liquor is ordinarily passed through a series of evaporators where it is concentrated. The highly concentrated resulting mixture is, according to general practice, burned in a rotary furnace, or incinerator, to form a clinker known as black ash. Black ash is mixed with sodium sulfate and reduced in a smelting furnace and the resulting mixture produced therein is drained into a dissolving tank. The solution thus formed is drawn into another tank where lime is added to causticize the sodium carbonate present and the liquor allowed to settle. The clear solution from this tank is drawn off and used again for charging the digester.

It is an object of this invention to provide a combined black liquor combusting and smelting furnace for use in a process as herein described, which will perform the function of the rotary furnace and the reducing furnace.

It is a further object of this invention to produce a furnace in which the burning of the black liquor can be controlled so as to increase the reduction efficiency and to prevent sublimation of chemicals through excessive heat areas.

Other and further objects of this invention will be apparent from the disclosure in the specification and the accompanying drawings.

This invention (in a preferred form) is illustrated in the drawings and hereinafter more fully described.

On the drawings:

Figure 1 is a longitudinal sectional view showing my improved furnace together with the associated dissolving tank.

Figure 2 is a transverse sectional view of the furnace and tank shown in Figure 1.

As shown on the drawings:

My improved furnace A is supported above the dissolving tank B and has mounted therein a boiler C which is connected by a suitable flue to a disc evaporator D.

The tank B comprises end walls 1, side walls 2, and a bottom wall 3. The end walls and side walls extend below the bottom wall to form supports 4 and 5, respectively, to support the tank. The top wall 6 substantially covers the tank and is supported by the sides and end walls and a number of posts 7 located in the tank.

Supports 8 extend up from the bottom of the tank and a platform 9 is formed across the top of said supports. The platform 9 and the top wall 6 of the tank form the main support for the furnace. The platform 9 is located below the top wall of the tank and the part of the furnace supported thereby extends through an opening in the top wall as will be hereinafter described.

Side walls 10 and 11, a rear wall 13, and a front wall 12 together with the bottom walls 15 and 16 form the fire box of the furnace. The front wall 12 extends a substantial distance below the end of the rear wall 13. An intermediate wall 14 extending from substantially the bottom level of the front wall to the bottom level of the rear wall is located parallel to the end walls and close to the front wall to form a pit 14ª adjacent the front wall. The pit 14ª extends thru the opening in the tank and is supported on platform 9. The bottom wall of the furnace is formed in two sections, one section 15 extending rearwardly and upwardly from the intermediate wall 14 to the rear wall 13 and forms with the side walls 10 and 11 and the rear wall 13, the combustion zone of the furnace. The section 16 of the bottom wall of the furnace extends forwardly and downwardly from the end of the intermediate wall below and beyond the front wall. Section 16 slopes from the sides to the middle line, thereby forming a V-shaped trough 17 and leaving an opening 17ª between the front wall and the bottom for a purpose hereinafter described.

Earth filler 19 is provided on the top wall 6 of the tank to support the bottom and side walls of the furnace. The earth filler may extend to the ends of the furnace or a platform such as shown at 18 may be used to support the end wall of the furnace. Likewise, earth filler 19 on platform 9 is used to support the front section 16 of the furnace bottom.

The side wall 11 is provided with a manhole 20 and cover 21 to enable an operator to clean the furnace. The side wall is provided with an opening 22 through which a pipe line 23 extends for charging black liquor into the furnace.

A connection 24 is secured to the pipe 23 for the introduction of the black liquor. A pipe 25 is connected to and opens into the pipe 23 to supply the furnace with air. The pipe 25 is used also for the introduction of the sodium sulfate. In practice it has been found advantageous to locate the pipe 23 about midway of the end walls and slightly above the inclined section 15, and also to direct the open end of the pipe towards the rear wall as shown at 26.

Tuyeres 27 are located in the forward and lower end of the side walls and are given a downward slant so as to direct a current of air toward the bottom of the pit 14a. The amount of air introduced into the pit is regulated by valves 27a located on the ends of tuyeres 27.

The boiler C is supported within the furnace as shown and may be of any standard construction and provided, if desired, with a super heater 28. A pipe line 29 supplies the boiler with water or other liquids to be heated. The boiler is used for the purpose of utilizing the heat of the furnace and forms no part of my invention. The hot gases from the furnace are drawn through the boiler and through a pipe line 30 to a disc evaporator shown at D where the hot gases assist in the evaporation of other black liquor. A platform 31 is supported by posts 32 on the top wall 6 of the tank. The platform enables the operator to have access to the boiler for the purpose of cleaning it.

The walls of the tank and the supports located therein are preferably formed of reinforced concrete and the walls of the furnace are preferably made of fire brick.

In operation, the highly concentrated black liquor from the evaporator is supplied to the furnace through the pipes 24 and 23. Air and sodium sulfate are introduced through the pipe 25 for mixture with the black liquor in the pipe 23. The mixture is delivered to the combustion zone of the furnace so as to burn on or above the inclined section 15. The partially burned residues gradually slide down the inclined bottom wall section 15 and drop down into the pit 14a. These residues contain the sodium sulfate introduced into the furnace, the inorganic compounds of the black liquor, and some carbon or charred organic matter. A carefully regulated amount of oxygen is introduced into the pit through the tuyeres 27 and the burning continues, the carbon uniting with the air and also with the oxygen of the contained chemicals to cause a reduction of the sulfates. Smelted chemicals pass out through the opening 17a between the front wall and the bottom of the furnace and into the dissolving tank B. The solution of the dissolved chemicals is drawn from this tank into another tank (not shown) in which the solution is mixed with lime and allowed to settle. From thence, the liquor is drawn off and again used in the digesting of the pulp.

Heretofore, in regenerating the black liquor, the syrupy black liquor from the evaporators, has been drawn to a rotary incinerator where the evaporation was completed and the resulting black ash was taken therefrom and reduced in a smelting furnace. By using my improved furnace, it is now possible to accomplish these two steps in one operation. My improved furnace is adapted to receive the black liquor from the evaporators and to complete the evaporation thereof, and also to reduce the chemicals contained in partially burned residues formed in the upper part of the furnace. It will be readily seen that by the use of my improved furnace, the time and the expense of regeneration of black liquor are greatly reduced and also the operation is simplified, since the number of steps involved is less and, consequently, less labor is needed.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. A furnace for the evaporation and reduction of black liquor comprising two side walls, a front wall and a rear wall, the front wall extending below the rear wall, an intermediate wall parallel to and adjacent the front wall, and inclined bottom wall extending rearwardly and upwardly from the intermediate wall to the rear wall and forming, with the side and rear walls, the combustion zone of the furnace, a V-shaped bottom wall extending downwardly and forwardly from the intermediate wall below the front wall and forming with the front wall and side wall a reduction pit, said front wall having an opening at the bottom of said pit, a pipe having connections for receiving black liquor and air extending through the side wall and terminating a short distance inside thereof and at such location that the contents thereof are discharged over the upper inclined section of the bottom wall, and ducts passing through the lower, forward end of the side wall for introducing a regulated amount of air to the lower section of the fire box.

2. A furnace for the regeneration of black liquor having a two-part bottom, each part being located at a different level to thereby provide an upper combustion zone and a lower reduction zone, the bottom of the upper zone extending upwardly and rearwardly from the reduction zone, a tuyere for introducing a mixture of black liquor and air to the combustion zone, said tuyere extending to the rear of said combustion zone to direct said stream away from said reduction zone and ducts for introducing air to the lower combustion zone.

ALFRED G. KERNIN.